(12) United States Patent
Kindaichi et al.

(10) Patent No.: US 11,644,563 B2
(45) Date of Patent: May 9, 2023

(54) AIRCRAFT FOR IDENTIFYING A SUSPICIOUS VESSEL

(71) Applicant: SUBARU CORPORATION, Tokyo (JP)

(72) Inventors: Kumiko Kindaichi, Tokyo (JP); Kentaro Kudo, Tokyo (JP); Takayuki Oguri, Tokyo (JP); Akihiro Yamane, Tokyo (JP); Akitoshi Sakaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 455 days.

(21) Appl. No.: 16/681,976

(22) Filed: Nov. 13, 2019

(65) Prior Publication Data

US 2020/0202115 A1 Jun. 25, 2020

(30) Foreign Application Priority Data

Dec. 21, 2018 (JP) .............................. JP2018-239412

(51) Int. Cl.
| | | |
|---|---|---|
| *G01S 13/87* | (2006.01) | |
| *G01S 13/91* | (2006.01) | |
| *G01S 13/86* | (2006.01) | |
| *G06V 20/17* | (2022.01) | |
| *G06V 20/52* | (2022.01) | |
| *G06V 40/20* | (2022.01) | |

(Continued)

(52) U.S. Cl.
CPC .......... *G01S 13/872* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS 5,852,492 A * 12/1998 Nimblett .................. G01S 7/51
356/5.04
2002/0169527 A1* 11/2002 Cline ........................ G08G 3/00
701/21

(Continued)

FOREIGN PATENT DOCUMENTS

| EP | 3109659 A1 | 12/2016 |
|---|---|---|
| JP | 2004178258 A | 6/2004 |

(Continued)

OTHER PUBLICATIONS

Japanese Office Action dated Sep. 20, 2022 in Application No. JP2018-239412; with English Machine Translation; 8 pages.

*Primary Examiner* — Mohammed Rachedine
(74) *Attorney, Agent, or Firm* — Troutman Pepper Hamilton Sanders LLP

(57) ABSTRACT

An aircraft includes a vessel checker, an image generator, an appearance determining unit, and an information transmitter. The vessel checker identifies a suspicious vessel candidate by comparing a marine vessel detected by a marine search radar with a marine vessel transmitting data with an automatic identification system. The image generator generates an image by photographing the suspicious vessel candidate after the aircraft approaches the suspicious vessel candidate in accordance with a route for approaching the suspicious vessel candidate. The appearance determining unit determines whether the suspicious vessel candidate in the image has an appearance characteristic of a suspicious vessel. The information transmitter transmits, to an external apparatus, information indicating that the suspicious vessel candidate has the appearance characteristic of the suspicious vessel if the suspicious vessel candidate has the appearance characteristic of the suspicious vessel.

9 Claims, 4 Drawing Sheets

(51) Int. Cl.
*B64C 39/02* (2023.01)
*B64D 47/08* (2006.01)
*G06V 20/13* (2022.01)
*G06V 20/10* (2022.01)
*B64U 101/00* (2023.01)

(52) U.S. Cl.
CPC .............. *G06V 20/10* (2022.01); *G06V 20/13* (2022.01); *G06V 20/17* (2022.01); *G06V 20/52* (2022.01); *G06V 40/20* (2022.01); *B64U 2101/00* (2023.01); *G01S 13/917* (2019.05)

(56) References Cited

U.S. PATENT DOCUMENTS

| | | | |
|---|---|---|---|
| 2005/0140540 A1* | 6/2005 | Rees | G08G 5/065 342/36 |
| 2013/0200207 A1* | 8/2013 | Pongratz | B64C 39/024 244/2 |
| 2017/0168133 A1 | 6/2017 | Daehler | |
| 2020/0257880 A1* | 8/2020 | Dicander | G01S 13/72 |

FOREIGN PATENT DOCUMENTS

| | | | | |
|---|---|---|---|---|
| JP | 2004326363 A | | 11/2004 | |
| JP | 2005-096674 A | | 4/2005 | |
| JP | 2005214645 A | | 8/2005 | |
| JP | 2009031188 A | | 2/2009 | |
| JP | 2011208961 A | | 10/2011 | |
| JP | 2017191593 A | | 10/2017 | |
| KR | 20170031896 A | | 3/2017 | |
| WO | WO-2007086055 A1 | * | 8/2007 | ............. B63B 35/52 |
| WO | WO-2008015467 A1 | * | 2/2008 | ........... G01S 13/726 |
| WO | WO-2017115947 A1 | * | 7/2017 | ............. B63B 17/00 |
| WO | WO-2019130554 A1 | * | 7/2019 | ......... G01S 13/9027 |
| WO | WO-2019171089 A1 | * | 9/2019 | ............. B63B 1/107 |

* cited by examiner

AIRCRAFT FOR IDENTIFYING A SUSPICIOUS VESSEL

CROSS-REFERENCE TO RELATED APPLICATIONS

The present application claims priority from Japanese Patent Application No. 2018-239412 filed on Dec. 21, 2018, the entire contents of which are hereby incorporated by reference.

BACKGROUND

The disclosure relates to aircrafts capable of flying through the air.

Japanese Unexamined Patent Application Publication No. 2005-096674 discloses a known technology that identifies a marine vessel near an own vessel as a suspicious vessel (i.e., a marine vessel acting suspiciously) based on the activity pattern the marine vessel.

SUMMARY

An aspect of the disclosure provides an aircraft including a vessel checker, an image generator, an appearance determining unit, and an information transmitter. The vessel checker identifies a suspicious vessel candidate by comparing a marine vessel detected by a marine search radar with a marine vessel transmitting data with an automatic identification system. The image generator generates an image by photographing the suspicious vessel candidate after the aircraft approaches the suspicious vessel candidate in accordance with a route for approaching the suspicious vessel candidate. The appearance determining unit determines whether the suspicious vessel candidate in the image has an appearance characteristic of a suspicious vessel. The information transmitter transmits, to an external apparatus, information indicating that the suspicious vessel candidate has the appearance characteristic of the suspicious vessel if the suspicious vessel candidate has the appearance characteristic of the suspicious vessel.

An aspect of the disclosure provides an aircraft including circuitry. The circuitry identifies a suspicious vessel candidate by comparing a marine vessel detected by a marine search radar with a marine vessel transmitting data with an automatic identification system. The circuitry generates an image by photographing the suspicious vessel candidate after the aircraft approaches the suspicious vessel candidate in accordance with a route for approaching the suspicious vessel candidate. The circuitry determines whether the suspicious vessel candidate in the image has an appearance characteristic of a suspicious vessel. The circuitry transmits, to an external apparatus, information indicating that the suspicious vessel candidate has the appearance characteristic of the suspicious vessel if the suspicious vessel candidate has the appearance characteristic of the suspicious vessel.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
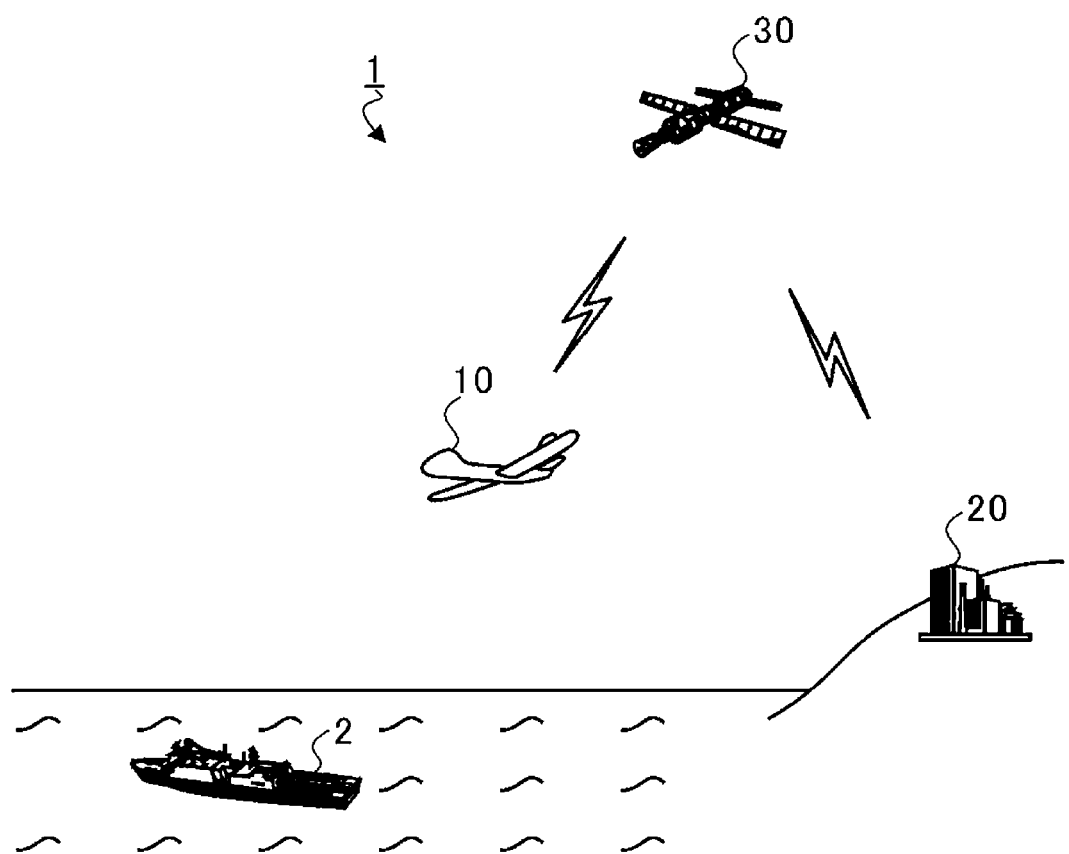
FIG. 1 schematically illustrates the configuration of a flight control system.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. In the technology disclosed in JP-A No. 2005-096674, the search range for suspicious vessels is limited to a region surrounding one's own vessel and is also small. Therefore, even if a suspicious vessel is present, the suspicious vessel may not be appropriately identified.

It is desirable to provide an aircraft capable of appropriately identifying a suspicious vessel from mid-air.

<Flight Control System 1>

FIG. 1 schematically illustrates the configuration of a flight control system 1. The flight control system 1 includes an unmanned aircraft 10, an external apparatus 20, and a satellite 30.

The unmanned aircraft 10 is an aircraft not boarded by man and identifies a suspicious vessel 2 on the sea. The external apparatus 20 is set on the ground and receives information related to a candidate for the suspicious vessel 2 from the unmanned aircraft 10 so as to identify the suspicious vessel 2. Although not described in detail, the external apparatus 20 also functions as a controller that ascertains the location and conditions of the unmanned aircraft 10 and transmits an emergency flight control command of the unmanned aircraft 10. Instead of being set on the ground, the external apparatus 20 may be either one of, for instance, an aircraft and a marine vessel separate from the unmanned aircraft 10. The satellite 30 is responsible for communication between the unmanned aircraft 10 and the external apparatus 20. Although an unmanned aircraft is described here as an example of an aircraft, either one of a manned aircraft and an optionally piloted vehicle (OPV) is also possible so long as the aircraft is a device that flies through the air.

The satellite 30 is used for the communication between the unmanned aircraft 10 and the external apparatus 20 for the following reason. For example, the unmanned aircraft 10 may sometimes lower its altitude to approach the suspicious vessel 2. Then, the line-of-sight distance of the unmanned aircraft 10 decreases, possibly making it difficult for the unmanned aircraft 10 and the external apparatus 20 to directly communicate (i.e., directly link) with each other. With the intervention of the satellite 30, the limitation on the line-of-sight distance can be released, so that the communication between the unmanned aircraft 10 and the external apparatus 20 can be reliably established.

<Unmanned Aircraft 10>

Figure 2:
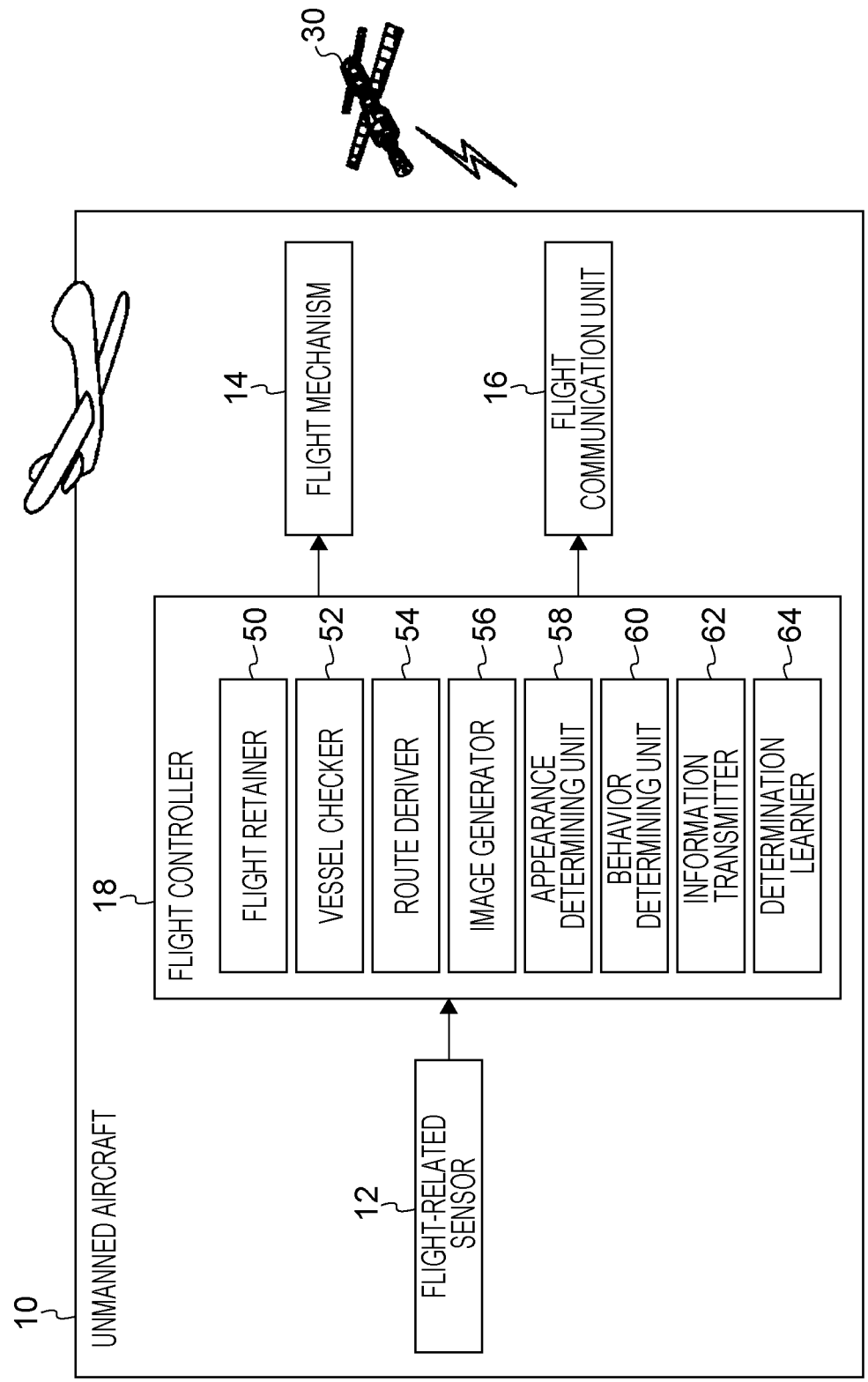
FIG. 2 is a functional block diagram illustrating a control system of an unmanned aircraft.

FIG. 2 is a functional block diagram illustrating a control system of the unmanned aircraft 10. The unmanned aircraft 10 includes a flight-related sensor 12, a flight mechanism 14, a flight communication unit 16, and a flight controller 18.

The flight-related sensor 12 detects the current flight conditions, such as the flight location (including the longitude, the latitude, and the altitude), the aircraft speed, the aircraft orientation, the wind force received by the aircraft, the wind direction, the weather, the atmospheric pressure surrounding the aircraft, and the temperature, via various sensors, such as an inertial navigation system, provided in the unmanned aircraft 10. Furthermore, the flight-related sensor 12 provided in the unmanned aircraft 10 includes a marine search radar capable of searching for a marine vessel in a maritime range of 200 km or more, an automatic identification system (AIS) receiver capable of receiving data in an AIS, and an electro-optical infrared (EO/IR) camera capable of photographing an infrared image.

An AIS is a VHF digital wireless device that transmits information including an identification code, such as a maritime mobile service identity (MMSI) code, vessel name, horizontal position, course, speed, and destination. In addition to or as an alternative to text display, the AIS can display, on an electronic chart or a radar screen, a marine vessel that is transmitting data.

The flight mechanism 14 includes fixed wings fixed to the aircraft, and also includes an internal combustion engine (e.g., a jet engine or a reciprocating engine) that obtains a thrust force. The thrust force causes a lift force to occur around the wings, thereby maintaining a state where the aircraft floats in the air. The mechanism that generates the lift force is not limited to this and may obtain a lift force and a thrust force by using a rotatable rotary wing (rotor), as in a rotary-wing aircraft (helicopter).

The flight mechanism 14 may adjust, for instance, the bank angle (roll angle), the bow angle (pitch angle), and the output from the internal combustion engine by using either one of an elevator and an aileron, so as to change the flight direction (yaw angle), the altitude, and the flight speed.

The flight communication unit 16 establishes communication with the external apparatus 20 via the satellite 30 and transmits the information acquired by the unmanned aircraft 10 to the external apparatus 20.

The flight controller 18 is constituted of a semiconductor integrated circuit including a central processing unit (CPU), a read-only memory (ROM) storing a program, and a random access memory (RAM) serving as a work area, and manages and controls the entire unmanned aircraft 10. The RAM (or the ROM) retains various types of data used by the unmanned aircraft 10 for flying, such as flight data based on which the planned flight route of the unmanned aircraft 10 and the flight conditions (such as the flight speed and the aircraft orientation) at each flight location on the planned route are specifiable.

The flight controller 18 may operate in cooperation with the ROM and the RAM to also serve as a flight retainer 50, a vessel checker 52, a route deriver 54, an image generator 56, an appearance determining unit 58, a behavior determining unit 60, an information transmitter 62, and a determination learner 64. A suspicious-vessel searching process performed by the unmanned aircraft 10 will be described in detail below based on the operation of each functional unit of the flight controller 18.

<Suspicious-Vessel Searching Process>

Figure 3:
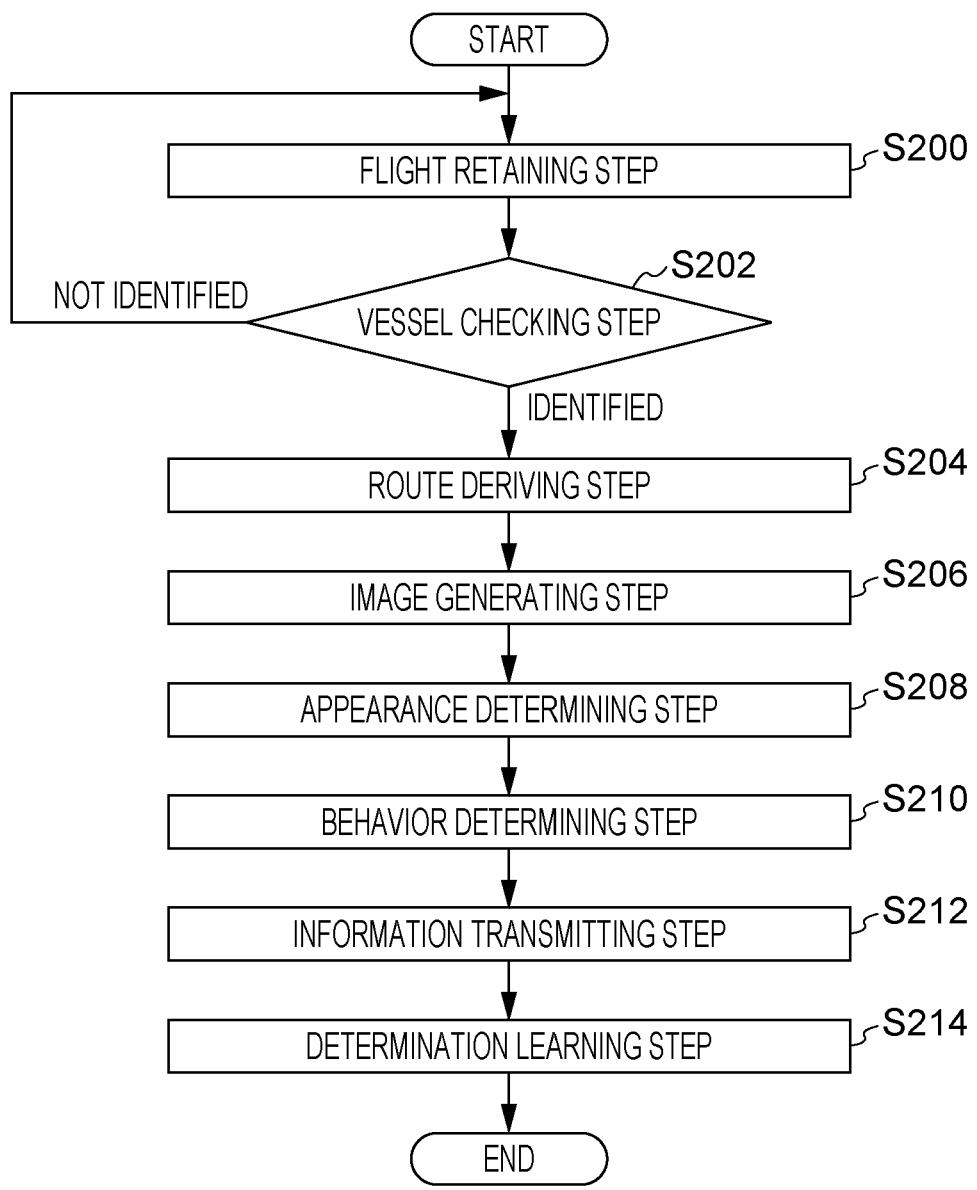
FIG. 3 is a flowchart illustrating the flow of a suspicious-vessel searching process.

FIG. 3 is a flowchart illustrating the flow of the suspicious-vessel searching process. The suspicious-vessel searching process includes step S200 where the flight retainer 50 controls the flight of the unmanned aircraft 10 in accordance with a planned route. When the vessel checker 52 identifies a suspicious vessel candidate in step S202, the route deriver 54 derives a route for approaching the suspicious vessel candidate in step S204. In step S206, the image generator 56 photographs the suspicious vessel candidate to generate an image. Then, the appearance determining unit 58 determines whether the suspicious vessel candidate has appearance characteristics of a suspicious vessel 2 in step S208, and the behavior determining unit 60 determines whether the suspicious vessel candidate has behavioral characteristics of a suspicious vessel 2 in step S210. If the suspicious vessel candidate has the appearance characteristics and behavioral characteristics of a suspicious vessel 2, the information transmitter 62 transmits this information to the external apparatus 20 in step S212. Finally, in step S214, the determination learner 64 adjusts the determination criterion of the appearance determining unit 58 based on an identification result obtained by the external apparatus 20 and indicating whether the suspicious vessel candidate is a suspicious vessel 2. Each of these steps will be described in detail below.

<Flight Retaining Step S200>

The flight retainer 50 acquires flight data from the RAM and performs flight control of the planned route of the unmanned aircraft 10 under the flight conditions at each flight location based on the flight data.

<Vessel Checking Step S202>

The marine search radar is capable of detecting all marine vessels present in a predetermined maritime range. Therefore, a marine vessel detected by the marine search radar and a marine vessel transmitting data in the AIS are normally the same. However, a suspicious vessel 2 is sometimes not transmitting data in the AIS. The vessel checker 52 extracts a marine vessel not transmitting data in the AIS from the marine vessels detected by the radar.

However, even a regular marine vessel, when moored, may sometimes stop transmitting data in the AIS. Therefore, a marine vessel not transmitting data in the AIS is not to be identified immediately as a suspicious vessel 2.

Thus, the vessel checker 52 compares marine vessels detected by the marine search radar with marine vessels transmitting data in the AIS, and identifies a marine vessel not transmitting data in the AIS as a suspicious vessel candidate for a suspicious vessel 2 from the marine vessels detected by the marine search radar.

If the vessel checker 52 does not identify a suspicious vessel candidate, the steps from the flight retaining step S200 and onward are repeated. If the vessel checker 52 identifies a suspicious vessel 2, the process proceeds to the route deriving step S204.

<Route Deriving Step S204>

The route deriver 54 derives a route for approaching the suspicious vessel candidate identified by the vessel checker 52.

Figure 4:
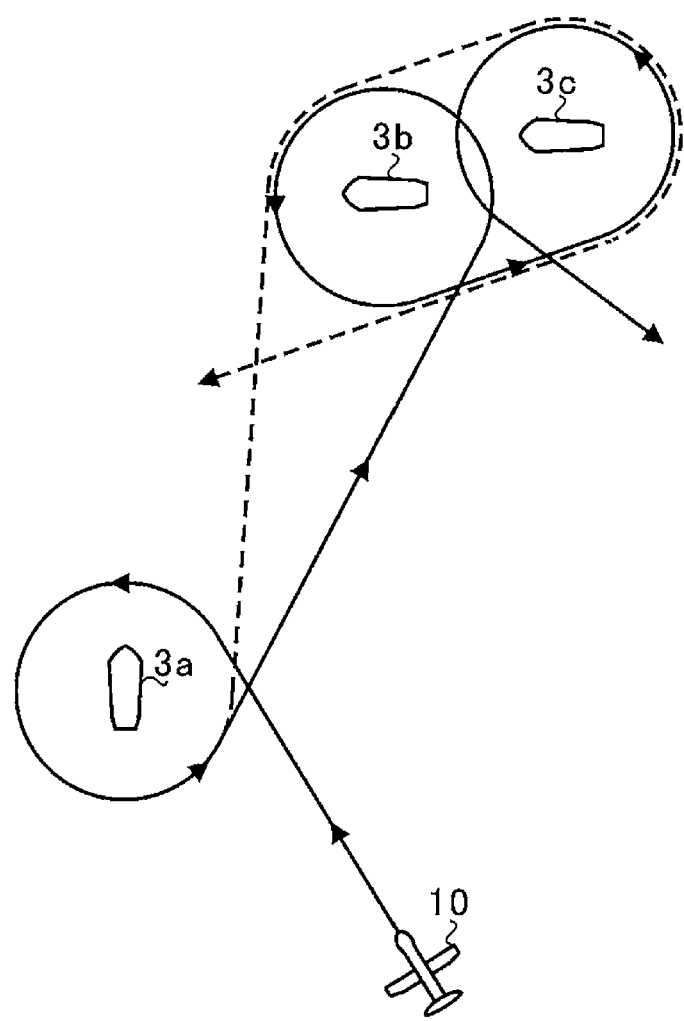
FIG. 4 illustrates a process performed by a route deriver.

FIG. 4 illustrates the process performed by the route deriver 54. The following description relates to a case where there are three suspicious vessel candidates. The route of the unmanned aircraft 10 is indicated by solid arrows. The route deriver 54 estimates the courses of all suspicious vessel candidates and identifies one suspicious vessel candidate (i.e., a suspicious vessel candidate 3a) that can be approached the quickest by the aircraft. While continuously estimating the course of the identified suspicious vessel candidate 3a, the route deriver 54 derives an optimal route to the suspicious vessel candidate 3a. In accordance with this route, the flight retainer 50 causes the unmanned aircraft 10 to autonomously approach the suspicious vessel candidate 3a. In this case, the optimal route is the route on which the unmanned aircraft 10 consumes the lowest amount of fuel in view of the altitude (i.e., the atmospheric pressure surrounding the aircraft) the weather, the wind speed, and the wind direction. Thus, the unmanned aircraft 10 can quickly identify suspicious vessel candidates and can also search for suspicious vessels 2 for a long period of time.

The route deriver 54 then causes the unmanned aircraft 10 to fly in a circle above the suspicious vessel candidate 3a by a turning radius of a predetermined distance. When the circling is completed, the route deriver 54 identifies another suspicious vessel candidate (i.e., a suspicious vessel candidate 3b) that can be approached the quickest by the aircraft. While continuously estimating the course of the identified suspicious vessel candidate 3b, the route deriver 54 derives an optimal route to the suspicious vessel candidate 3b. In accordance with this route, the flight retainer 50 causes the unmanned aircraft 10 to autonomously approach the suspicious vessel candidate 3b. This operation is repeated for all suspicious vessel candidates 3a, 3b, and 3c.

The predetermined distance indicates a distance within a range in which an infrared image used for determining the external appearance of a suspicious vessel candidate can be photographed with the EO/IR camera. Since there is a possibility of a certain kind of an attack from a suspicious vessel candidate, the predetermined distance is desirably the maximum distance within the photographable range of the infrared image.

If suspicious vessel candidates are close to each other, as in the suspicious vessel candidates 3b and 3c in FIG. 4, there is a case where one suspicious vessel candidate 3c is approached even if the other suspicious vessel candidate 3b is far away. In that case, the two candidates may be treated as a single unit, and the route deriver 54 may derive a route for circling around the outer periphery of the single unit, as indicated by a dashed line in FIG. 4.

<Image Generating Step S206>

While the aircraft is circling along the route derived by the route deriver 54, the image generator 56 photographs each suspicious vessel candidate by using the EO/IR camera, so as to generate an image (such as an infrared image). In this case, the suspicious vessel candidate is photographed from a plurality of directions (angles) to improve the identification accuracy of the suspicious vessel 2.

<Appearance Determining Step S208>

The appearance determining unit 58 determines whether the suspicious vessel candidate in the image has appearance characteristics of a suspicious vessel 2.

The appearance characteristics refer to the following external appearances: (1) a fishing vessel in appearance but not having any fishing equipment on board; (2) a fishing vessel in appearance but having the engine located at a position different from that of a normal fishing vessel; (3) a vessel having a plurality of (e.g., two to four) engines; (4) a vessel having a fake funnel; (5) a vessel having a large hatch at the stern (i.e., a vessel possibly equipped with either one of or both of a landing boat and a submersible scooter); (6) a vessel having a larger number of antennas than a normal vessel; and (7) a vessel having either one of or both of a rocket gun and a machine gun. If the suspicious vessel candidate corresponds to any one of these external appearances, the appearance determining unit 58 determines that the suspicious vessel candidate may possibly be a suspicious vessel 2.

<Behavior Determining Step S210>

Based on the course of the suspicious vessel candidate identified by the route deriver 54, the behavior determining unit 60 determines whether the suspicious vessel candidate has behavioral characteristics of a suspicious vessel 2. Alternatively, for instance, based on a radio wave received by the digital wireless device, if the suspicious vessel candidate is performing communication over a long period of time by using a special radio wave not commonly used by fishing vessels, the behavior determining unit 60 may determine that the suspicious vessel candidate may possibly be a suspicious vessel 2.

The behavioral characteristics refer to the following behaviors: (1) a fishing vessel in appearance but moored at the same location without any fishing activity; and (2) a vessel roaming without any set course. If the suspicious vessel candidate corresponds to any one of these behaviors, the behavior determining unit 60 determines that the suspicious vessel candidate may possibly be a suspicious vessel 2. The behavior determining unit 60 can determine the behavioral characteristics without approaching the suspicious vessel candidate by remotely checking the course of the suspicious vessel candidate.

By causing the appearance determining unit 58 to determine the appearance characteristics and the behavior determining unit 60 to determine the behavioral characteristics, the accuracy for determining that a suspicious vessel candidate may possibly be a suspicious vessel 2 is improved.

<Information Transmitting Step S212>

If the suspicious vessel candidate has the appearance characteristics of a suspicious vessel 2 or behavioral characteristics of a suspicious vessel 2, the information transmitter 62 establishes communication with the external apparatus 20 via the flight communication unit 16 and the satellite 30, and transmits the information to the external apparatus 20.

<Determination Learning Step S214>

As described above, when the appearance determining unit 58 determines that the suspicious vessel candidate has the appearance characteristics of a suspicious vessel 2, the information transmitter 62 transmits the information to the external apparatus 20. Moreover, when the behavior determining unit 60 determines that the suspicious vessel candidate has the behavioral characteristics of a suspicious vessel 2, the information transmitter 62 transmits the information to the external apparatus 20. The external apparatus 20 identifies whether the suspicious vessel candidate is a suspicious vessel 2 based on the determination results obtained by the appearance determining unit 58 and the behavior determining unit 60.

The determination learner 64 is constituted of artificial intelligence (AI) and adjusts the determination criteria of the appearance determining unit 58 and the behavior determining unit 60 based on the identification result obtained by the external apparatus 20 and indicating whether the suspicious vessel candidate is a suspicious vessel 2. In detail, the weight assigned to an item referred to when the external apparatus 20 identifies that the suspicious vessel candidate is a suspicious vessel 2 is increased. In contrast, the weight assigned to an item referred to when the external apparatus 20 identifies that the suspicious vessel candidate is not a suspicious vessel 2 is decreased. Then, the appearance determining unit 58 and the behavior determining unit 60 multiplies each item by the weight to give a score thereto, so as to determine whether there are appearance characteristics and behavioral characteristics.

According to this configuration, the determination accuracy for the appearance characteristics and behavioral characteristics of the suspicious vessel 2 becomes higher as time elapses, thereby increasing the probability (suspicious-vessel identification performance) in which the external apparatus 20 identifies that a marine vessel, transmitted as a suspicious vessel candidate by the appearance determining unit 58 and the behavior determining unit 60, is a suspicious vessel 2.

Although the route deriver 54 is installed in the unmanned aircraft 10 in the present embodiment, the route deriver 54 may be provided in the external apparatus 20. With the route deriver 54 being provided in the external apparatus 20 in this manner, the external apparatus 20 with unlimited throughput can handle the heavy processing load for deriving a route for approaching a suspicious vessel candidate, instead of the unmanned aircraft 10 with limited throughput, thereby reducing the processing load of the unmanned aircraft 10. Furthermore, although the determination learner 64 is installed in the unmanned aircraft 10 in the present embodiment, the determination learner 64 may be provided in the external apparatus 20. With the determination learner 64 being provided in the external apparatus 20 in this manner, determination results obtained by individual unmanned aircrafts 10 can be unified and adjusted by the external apparatus 20. In other words, variations in determination criteria can be suppressed.

Accordingly, the unmanned aircraft 10 identifies a suspicious vessel candidate, approaches the suspicious vessel candidate, and determines whether the suspicious vessel candidate has appearance characteristics and behavioral characteristics of a suspicious vessel 2, so as to appropriately identify the suspicious vessel 2 from mid-air. Furthermore, the unmanned aircraft 10 autonomously searches for a suspicious vessel candidate and transmits the information so that the external apparatus 20 may simply identify a suspicious vessel 2 at the timing at which the information about the suspicious vessel candidate is transmitted. In other words, the workload can be reduced without someone deriving a route for extracting a suspicious vessel candidate or performing constant observation.

There are also provided a program for causing a computer to function as an aircraft (unmanned aircraft 10), and a storage medium, such as a computer-readable flexible disk, a magneto-optical disk, a ROM, a compact disc (CD), a digital versatile disc (DVD), or a Blu-ray disc (BD), having the program stored therein. The program in this case refers to a data processing unit described in any language and any description method.

Although the preferred embodiment of the present disclosure has been described above with reference to the appended drawings, the present disclosure is not limited to this embodiment. It is obvious to a person skilled in the art that various modifications and revisions are possible within the scope defined in the claims, and such modifications and revisions are to be included in the technical scope of an embodiment of the disclosure.

Although the steps in the suspicious-vessel searching process herein are performed in a time-series fashion in the sequence indicated in the flowchart, the steps may be performed concurrently or may include steps in a subroutine.

According to an embodiment of the disclosure, a suspicious vessel can be appropriately identified from mid-air.

The invention claimed is:

1. An aircraft comprising:
a controller including a semiconductor integrated circuit, the controller being configured to:
compare one or more first marine vessels detected by a marine search radar with one or more second marine vessels transmitting data with an automatic identification system, and extract at least a marine vessel not transmitting data in the automatic identification system from the one or more first marine vessels detected by the marine search radar to identify the marine vessel as a suspicious vessel candidate;
begin to generate one or more images of the suspicious vessel candidate after the aircraft approaches the suspicious vessel candidate in a case where the vessel checker extracts the marine vessel to identify the marine vessel as the suspicious vessel candidate;
estimate a course of the suspicious vessel candidate;
give a first score to determine whether the suspicious vessel candidate has an appearance characteristic of a suspicious vessel based on the one or more images, a first item associated with the appearance characteristic, and a first weight assigned to the first item; and
give a second score to determine whether the suspicious vessel candidate has a behavioral characteristic of the suspicious vessel based on the estimated course of the suspicious vessel candidate identified by the route deriver, a second item associated with the behavioral characteristic, and a second weight assigned to the second item, and
an information transmitter communicably connected to an external apparatus through a satellite, the external apparatus being set on another aircraft or marine vessel separate from the aircraft or being set on a ground, the information transmitter being configured to:
begin to transmit, to the external apparatus, at least one of: (1) information indicating that at least the suspicious vessel candidate has the appearance characteristic of the suspicious vessel in a case where the appearance determining unit determines that the suspicious vessel candidate has the appearance characteristic of the suspicious vessel; and (2) information indicating that the suspicious vessel candidate has the behavioral characteristic of the suspicious vessel in a case where the behavior determining unit determines that the suspicious vessel candidate has the behavioral characteristic of the suspicious vessel; and
receive, from the external apparatus through the satellite, identification result identified by the external apparatus and indicating whether the suspicious vessel candidate is the suspicious vessel or not, and
wherein the controller is further configured to adjust the first weight and the second weight based on the identification result obtained from the external apparatus.

2. The aircraft according to claim 1, wherein the controller is configured to:
derive a flight route for approaching the suspicious vessel candidate including a route on which the aircraft consumes a lowest amount fuel for approaching the suspicious vessel candidate and a route on which the aircraft flies in a circle above the suspicious vessel candidate after the aircraft approaches the suspicious vessel candidate, and begin to generate the one or more images after the aircraft approaches the suspicious vessel candidate in accordance with the flight route for approaching the suspicious vessel candidate.

3. The aircraft according to claim 1, wherein the controller is configured to generate the one or more images of the suspicious vessel candidate by photographing the suspicious vessel candidate from a plurality of angles.

4. The aircraft according to claim 3, wherein the controller is configured to generate the one or more images of the suspicious vessel candidate by photographing the suspicious vessel candidate from a plurality of angles.

5. The aircraft according to claim 1, wherein the controller is configured to:
identify suspicious vessel candidates including one or more first suspicious vessel candidates and one or more second suspicious vessel candidates, different from each other;
derive a flight route for approaching all of the suspicious vessel candidates; and
generate the one or more images while the aircraft flies along the flight route,
wherein the flight route includes:
a first route on which the aircraft consumes a lowest amount fuel for approaching the one or more first suspicious vessel candidates;
a second route on which the aircraft flies, after the aircraft flies along the first route, along a first circle surrounding the one or more first suspicious vessel candidates and being within a range in which an infrared image used for determining the external appearance of the one or more first suspicious vessel can be photographed;
a third route on which the aircraft consumes a lowest amount fuel for approaching the one or more second suspicious vessel candidates after fling along the second route; and
a fourth route on which the aircraft flies, after the aircraft flies along the third route, along a second circle surrounding the one or more second suspicious vessel candidates and being within a range in which an infrared image used for determining the external appearance of the one or more second suspicious vessel can be photographed.

6. The aircraft according to claim 1, wherein
the appearance characteristic associating with the first item corresponds to one of appearances of: (1) a fishing vessel in appearance but not having any fishing equipment on board; (2) a fishing vessel in appearance but having the engine located at a position different from that of a normal fishing vessel; (3) a vessel having a plurality of engines; (4) a vessel having a fake funnel; (5) a vessel having a large hatch at its stern; (6) a vessel having a larger number of antennas than a predetermined number; and (7) a vessel having either one of or both of a rocket gun and a machine gun, and
the behavioral characteristics associating with the second item corresponds to one of behaviors of: (1) a fishing vessel in appearance but moored at the same location without any fishing activity; and (2) a vessel roaming without any set course.

7. An aircraft comprising circuitry configured to:
compare one or more first marine vessels detected by a marine search radar with one or more second marine vessels transmitting data with an automatic identification system, and extract at least a marine vessel not transmitting data in the automatic identification system from the one or more first marine vessels detected by the marine search radar to identify the marine vessel as a suspicious vessel candidate,
begin to generate one or more images of the suspicious vessel candidate after the aircraft approaches the suspicious vessel candidate in a case where a vessel checker extracts the marine vessel to identify the marine vessel as the suspicious vessel candidate,
estimate a course of the suspicious vessel candidate;
give a first score to determine whether suspicious vessel candidate has an appearance characteristic of a suspicious vessel based on the one or more images, a first item associated with the appearance characteristic, and a first weight assigned to the first item,
give a second score to determine whether the suspicious vessel candidate has a behavioral characteristic of the suspicious vessel based on the estimated course of the suspicious vessel candidate identified by the route deriver, a second item associated with the behavioral characteristic, and a second weight assigned to the second item,
begin to transmit, by communicably connecting to an external apparatus through a satellite, at least one of: (1) information indicating that at least the suspicious vessel candidate has the appearance characteristic of the suspicious vessel in a case where an appearance determining unit determines that the suspicious vessel candidate has the appearance characteristic of the suspicious vessel; and (2) information indicating that the suspicious vessel candidate has the behavioral characteristic of the suspicious vessel in a case where the behavior determining unit determines that the suspicious vessel candidate has the behavioral characteristic of the suspicious vessel, the external apparatus being set on another aircraft or marine vessel separate from the aircraft or being set on a ground,
receive, from the external apparatus through the satellite, identification result identified by the external apparatus and indicating whether the suspicious vessel candidate is the suspicious vessel; and
adjust the first weight and the second weight based on the identification result obtained from the external apparatus.

8. The aircraft according to claim 7,
wherein the circuitry is configured to:
identify suspicious vessel candidates including one or more first suspicious vessel candidates and one or more second suspicious vessel candidates, different from each other;
derive a flight route for approaching all of the suspicious vessel candidates;
generate the one or more images while the aircraft flies along the flight route, and
wherein the flight route includes;
a first route on which the aircraft consumes a lowest amount fuel for approaching the one or more first suspicious vessel candidates;
a second route on which the aircraft flies, after the aircraft flies along the first route, along a first circle surrounding the one or more first suspicious vessel candidates and being within a range in which an infrared image used for determining the external appearance of the one or more first suspicious vessel can be photographed;
a third route on which the aircraft consumes a lowest amount fuel for approaching the one or more second suspicious vessel candidates after fling along the second route; and a fourth route on which the aircraft flies, after the aircraft flies along the third route, along a second circle surrounding the one or more second suspicious vessel candidates and being within a range in which an infrared image used for determining the external appearance of the one or more second suspicious vessel can be photographed.

9. The aircraft according to claim 7, wherein the appearance characteristic associating with the first item corresponds to one of appearances of: (1) a fishing vessel in appearance but not having any fishing equipment on board; (2) a fishing vessel in appearance but having the engine located at a position different from that of a normal fishing vessel; (3) a vessel having a plurality of engines; (4) a vessel having a fake funnel; (5) a vessel having a large hatch at its stern; (6) a vessel having a larger number of antennas than a predetermined number; and (7) a vessel having either one of or both of a rocket gun and a machine gun, and the behavioral characteristics associating with the second item corresponds to one of behaviors of: (1) a fishing vessel in appearance but moored at the same location without any fishing activity; and (2) a vessel roaming without any set course.

* * * * *